(12) United States Patent
Bousquet

(10) Patent No.: US 6,887,088 B2
(45) Date of Patent: May 3, 2005

(54) BUILT-IN DEVICE AND SYSTEM FOR MASKING AN ACCESSORY, IN PARTICULAR AN ELECTRICAL CONNECTION AND RELATED ELECTRICAL EQUIPMENT

(75) Inventor: Andrë Bousquet, Paris (FR)

(73) Assignee: Meljac, Paris (FR)

( * ) Notice: Subject to any disclaimer, the term of this patent is extended or adjusted under 35 U.S.C. 154(b) by 0 days.

(21) Appl. No.: 10/204,697

(22) PCT Filed: Feb. 23, 2001

(86) PCT No.: PCT/FR01/00526

§ 371 (c)(1),
(2), (4) Date: Dec. 4, 2002

(87) PCT Pub. No.: WO01/63703

PCT Pub. Date: Aug. 30, 2001

(65) Prior Publication Data

US 2003/0143880 A1 Jul. 31, 2003

(30) Foreign Application Priority Data

Feb. 23, 2000 (FR) .............................. 00 02276

(51) Int. Cl.⁷ .............................................. H01R 13/44
(52) U.S. Cl. ......................................... 439/142; 174/67
(58) Field of Search ........................... 439/142; 174/48, 174/67; 220/242

(56) References Cited

U.S. PATENT DOCUMENTS

| | | | | |
|---|---|---|---|---|
| 198,178 A | * | 12/1877 | Alford | 292/175 |
| 943,958 A | * | 12/1909 | Wheeler | 220/242 |
| 1,467,261 A | | 9/1923 | Wilbert | 220/3.8 |
| 2,996,566 A | * | 8/1961 | Stas | 174/53 |
| 3,794,956 A | | 2/1974 | Dubreuil | 439/131 |
| 4,134,516 A | * | 1/1979 | Sullo | 220/242 |
| 5,122,069 A | * | 6/1992 | Brownlie et al. | 439/131 |
| 5,800,188 A | | 9/1998 | Barber et al. | 439/142 |
| 6,610,927 B2 | * | 8/2003 | Dinh et al. | 174/66 |

FOREIGN PATENT DOCUMENTS

EP    0 743 733    11/1996

* cited by examiner

Primary Examiner—Phuong Dinh
(74) Attorney, Agent, or Firm—Young & Thompson

(57) ABSTRACT

A built-in device for masking in particular an electrical connection (18) in a wall (2), in particular a building floor. The device includes a plate (3) wherein is formed a housing (11) and a valve sealing (4) the housing. The sealing valve bears on its outer surface a retractable pivoting shackle (6) in a recess (10) formed along the valve edge.

17 Claims, 3 Drawing Sheets

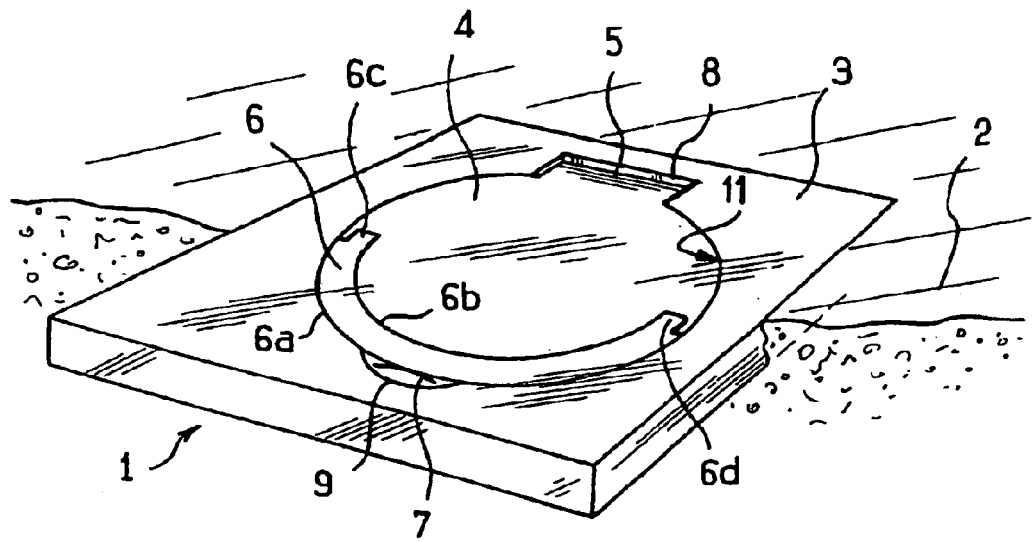
FIG_1
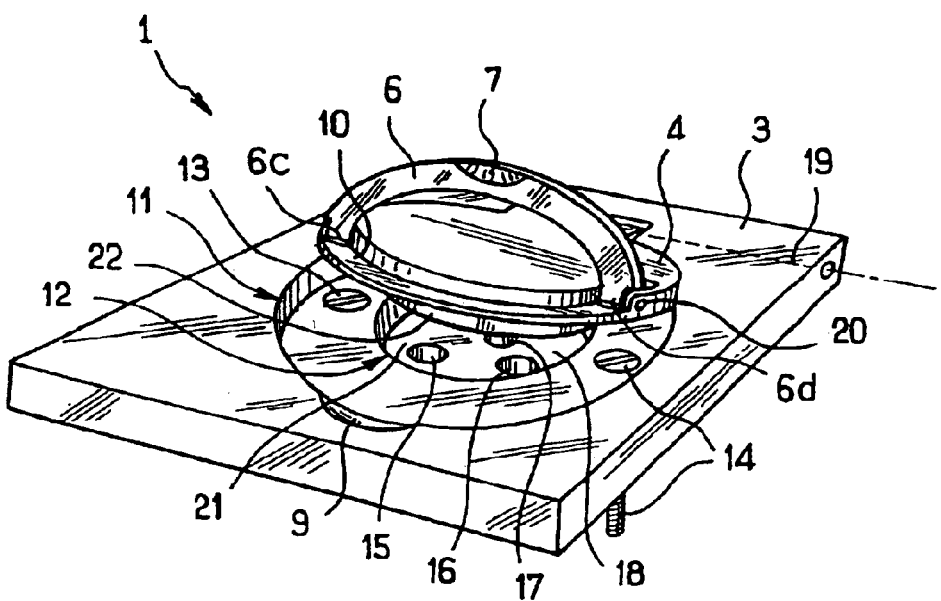
FIG_2

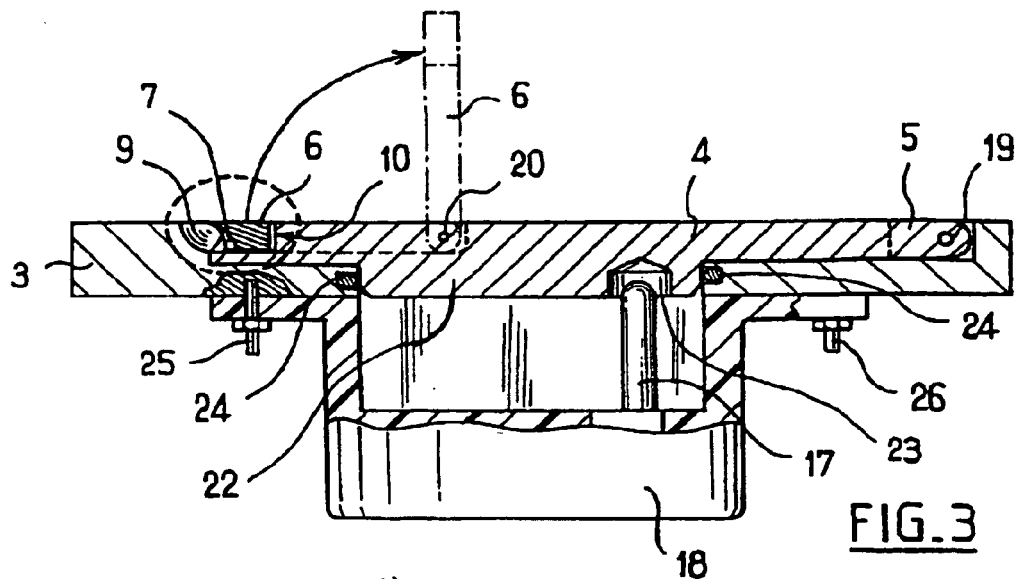
FIG_3
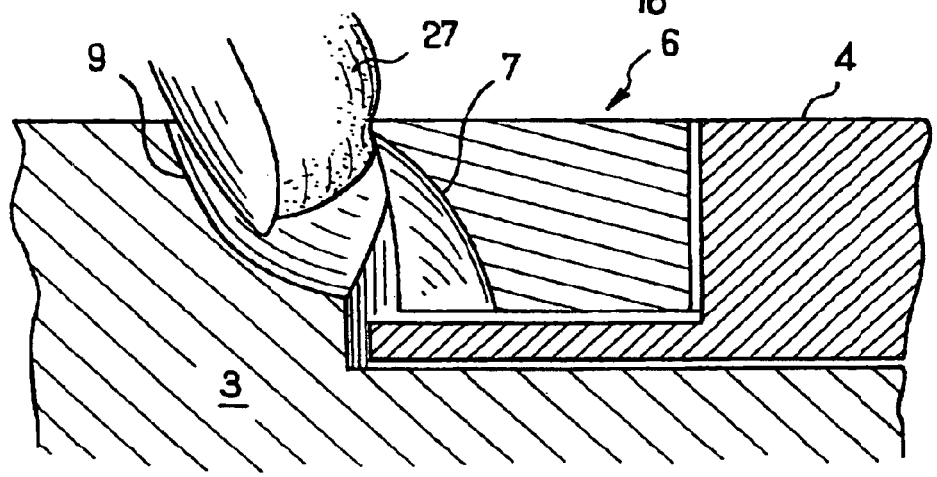
FIG_4
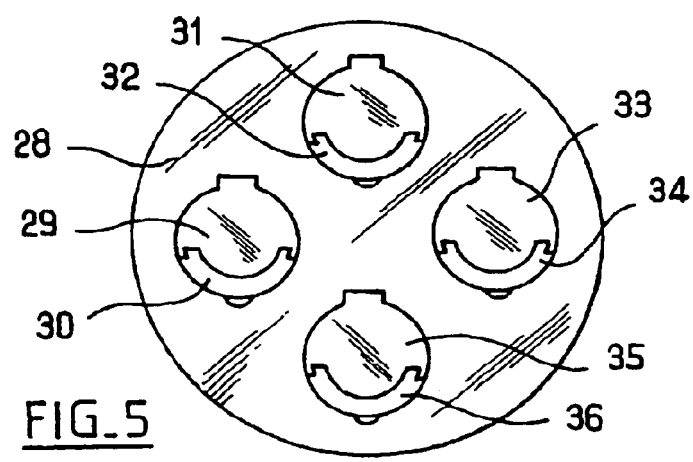
FIG_5

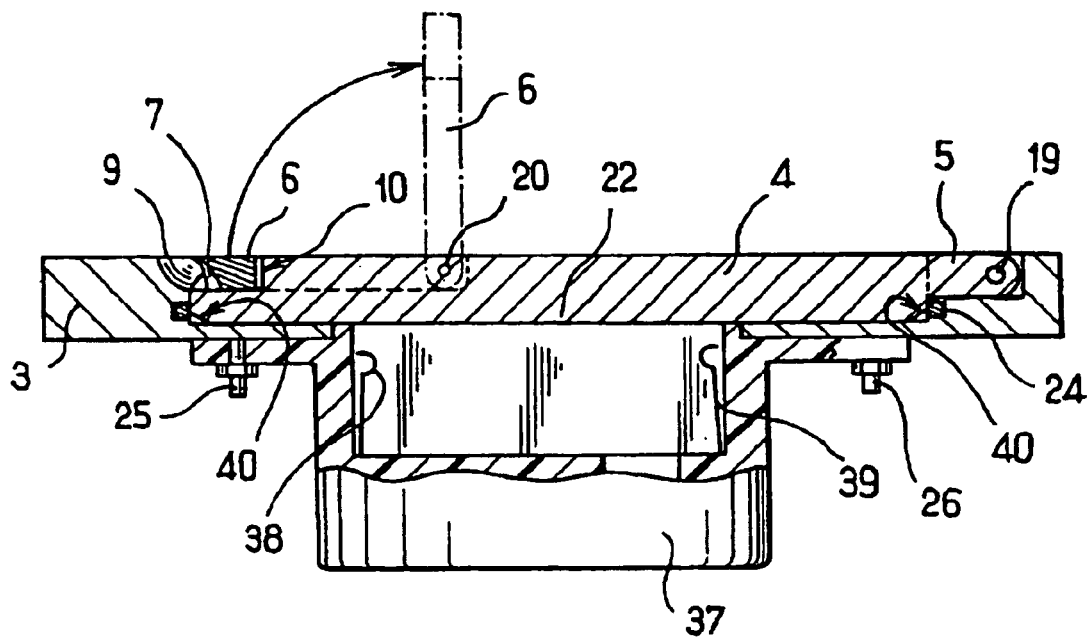
FIG_6
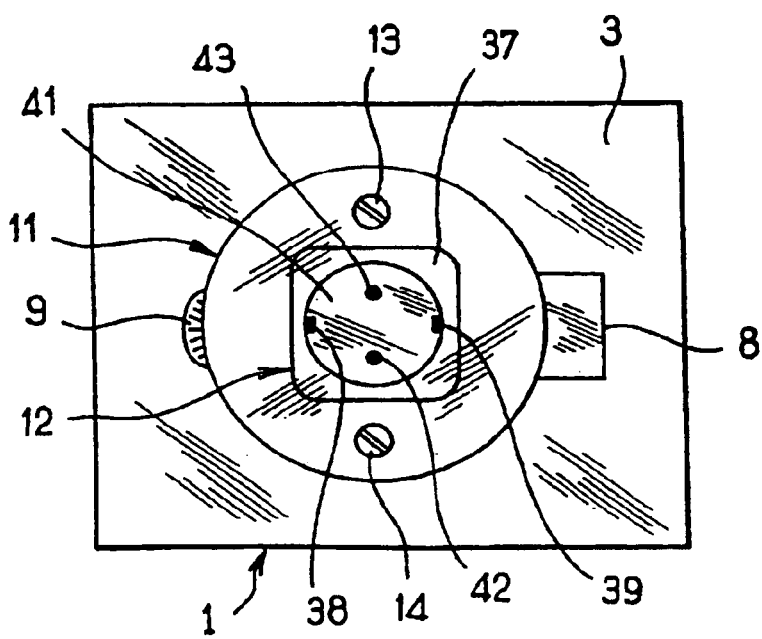
FIG_7

US 6,887,088 B2

BUILT-IN DEVICE AND SYSTEM FOR MASKING AN ACCESSORY, IN PARTICULAR AN ELECTRICAL CONNECTION AND RELATED ELECTRICAL EQUIPMENT

FIELD OF THE INVENTION

The present invention relates to a flush-mounting covering device for concealing an accessory, especially an electrical accessory, in a surface, in particular a floor of a building. It also relates to a system employing a set of flush-mounting covering devices as above. It further relates to electrical equipment comprising an electrical accessory equipped with the said covering device or system.

The electrical accessory can be an electrical connector such as a power socket, a telephone socket, a switch or a push-button.

BACKGROUND OF THE INVENTION

A covering device is known for telephone sockets, consisting essentially of a plate with a housing at its centre that can be closed by a thin pivoting flap, generally in the form of a disk. A female telephone socket fitted in the housing can receive an external male telephone plug when the flap is in the open position.

Even though an indentation is provided in one part of the edge of the housing, it is still difficult to grip the flap. This indentation permits penetration and/or accumulation of dirt.

One aim of the present invention is to remedy this drawback, by proposing a covering device that is provided with a flap that is reliable and is easy to manipulate.

BRIEF SUMMARY OF THE INVENTION

The aforesaid objective is achieved with a flush-mounting covering device for concealing an accessory, especially an electrical accessory, in a surface, in particular a floor of a building. The device can comprise a plate in which a housing is formed, and a flap for closing the housing. According to the invention, the closing flap has, on its external surface, a handle that is connected to the flap by pivoting means and is retractable in a recess formed along the edge of the flap.

With a handle of this kind, the flap can easily be lifted by pulling on the said pivoting handle. Furthermore, the safety and appearance of the device are optimized on account of the recess provided for receiving the handle.

The external surface of the flap can generally be of circular shape with a lateral projection formed by a lug, by which the flap is hinged to the plate, the lug fitting in an indentation formed in the plate.

Preferably, pivoting means are arranged at both ends of the handle and at the two corresponding ends of the recess formed along the edge of the flap, the two axes of the pivoting means being parallel to the pivoting axis of the flap, the pivoting axis of the flap and a line that is common to the two axes of the pivoting means being arranged on either side of the centre of the flap.

According to an advantageous feature of the invention, the pivoting means of the handle are such that in a position of maximum extension, the handle is roughly perpendicular to the flap.

Advantageously, the handle can include a manipulating recess at the junction between its base and its radially external periphery.

According to a preferred embodiment, the plate has, in one edge of the housing surrounding the flap in the closed position, a recess that is intended to make it easier to grasp the handle. The said recess is preferably located opposite a manipulating recess provided on the handle and in particular at the junction between the base of the handle and its external periphery.

According to the invention, to facilitate closing of the flap, the said flap can include a counterweight on its inside.

According to an advantageous feature of the invention, the counterweight is configured so as to fit snugly in the housing.

Advantageously, the counterweight includes a hollow for receiving a projecting electrical component, such as an earth connector, when the flap is in the closing position.

The invention also relates to a flush-mounting covering system for concealing a number of accessories, especially electrical accessories, in a surface, especially a floor of a building, comprising a plate in which several pairs are formed, each comprising a housing and a flap for closing the housing.

The invention further relates to flush-mounting electrical equipment comprising an electrical accessory mounted in the housing of a covering device or system as described above.

BRIEF DESCRIPTION OF THE DRAWINGS

Other advantages and characteristics of the invention will become clear on examining the detailed description of an example of application, which is not in any way limiting, and the appended drawings in which:

FIG. 1 is a schematic perspective view of the exterior of the device according to the invention incorporated in a floor shown in cutaway, the flap being in the closed position with the handle retracted;

FIG. 2 is a view similar to FIG. 1, but with the flap partially opened and the handle extended so that it can be pulled manually to lift the flap;

FIG. 3 is a sectional view following a median line perpendicular to the pivoting axis of the flap;

FIG. 4 is an enlargement of a part of FIG. 3 showing initial gripping of the handle with a finger;

FIG. 5 is a front view of a plate incorporating a number of housing-flap pairs to form a system according to the invention;

FIG. 6 is a sectional view identical to that in FIG. 3 but according to another embodiment of the invention; and FIG. 7 is a top view of the device without the flap according to the embodiment shown in FIG. 6.

DETAILED DESCRIPTION OF THE INVENTION

We shall now describe a flush-mounting covering device for concealing an electrical connection, although the invention is not limited to this.

Referring to FIG. 1, this shows a covering device 1 that is flush-mounted such that its external surface is flush with a floor 2 which can be a floor of a residential building or of business premises such as an office or an assembly room. The covering device comprises a plate 3, for example of stainless steel, of parallelepiped shape with two square bases. The external face of the plate has at its centre a housing 11 of circular general shape in which a flap 4 is engaged. The external face of the flap has a generally circular contour with a rectangular projection 5 forming a hinging lug, for hinge with the plate about a hinging axis 19 which is parallel to the front and rear sides of the plate. Housing 11 has an indentation 8 that receives lug 5. The flap is movable about axis 19 between the closed position shown in FIG. 1, in which it fits into housing 11 with its external surface in the plane of the external face of plate 3, and an open position shown in FIG. 2 in which it provides access to housing 11. Flap 4 has, along its edge, opposite lug 5, a handle in the shape of a circular arc. The external contour 6a of the external surface of the handle is an arc of the circular contour of the external face of the flap. The handle has a manipulating recess 7 which straddles a junction edge between the base of handle 6 and its radially external surface. The ends 6c and 6d of the handle are configured as hinging lugs, for hinge with flap 4 about a hinging axis 20 which is parallel to the hinging axis 19 between flap 4 and plate 3. Axes 19 and 20 are located on either side of the centre of flap 4. The handle is movable relative to flap 4 about axis 20 between a retracted position shown in FIG. 1 and an extended position shown in FIG. 2. Flap 4, in the form of a flattened cylinder, has along its front edge a recess 10 for receiving handle 6 in its retracted position. Housing 11 (more clearly shown in FIG. 2) of plate 3 has in addition a recess 9 which is located opposite indentation 8, and which faces the manipulating recess 7 when the handle is in the retracted position. In the closed position, the external face of plate 3, the external face of handle 6 and the external face of flap 4 are all in the same plane corresponding to the plane of the floor 2. A small cavity is then formed between recesses 9 and 7 and the external contour 6a to make it easier to grasp handle 6 in order to lift handle 6 and then, together therewith, flap 4, as shown in FIG. 2. Apart from this small cavity, the surface of the device is substantially smooth when the flap is closed and the handle is retracted.

FIG. 2 illustrates the covering device 1 during an opening operation—the hand pulling handle 6 upwards is not shown. Handle 6 is dislodged from recess 10 and is held in an oblique plane relative to the flap. Preferably stopping means are provided for limiting the pivoting of the handle to about 90°. In this way, the handle itself falls back to the retracted position when the flap is in the closed position. The said means can consist of a suitable configuration of lugs 6c, 6d and of the ends of recess 10. Handle 6 is C-shaped with a rectangular cross-section and a depth that is greater than half the thickness of flap 4. Recess 10 has a corresponding rectangular cross-section.

Raising of flap 4, from the closed position to the open position, is effected in two movements. First, the tip of a finger is inserted into the cavity formed by recesses 7 and 9 (FIG. 4). Handle 6 is raised as shown by the dot-and-dash line in FIG. 3. The second movement consists in pulling on handle 6 to cause flap 4 to pivot about the hinging axis 19. Axes 19 and 20 can be in the form of threaded rods (FIG. 2) screwed in plate 3 (axis 19) and in flap 4 (axis 20) and whose slotted ends are flush as shown. These screws pass through suitable holes in lug 5 (axis 19) and in lugs 6c and 6d (axis 20).

Return of flap 4 to its closed position is facilitated by a counterweight 22 located on the inner surface of flap 4.

Housing 11 has a cylindrical general shape with a circular hole 12 passing through the bottom of housing 11 at its centre. Hole 12 opens out through the internal face of plate 3, on which is fixed, by means of bolt and nut assemblies 25, 26 (FIG. 3), an electric socket 18 comprising two holes 15, 16 and a projecting earth connection 17 that are accessible in housing 11 via hole 12.

When the flap is closed, the cylindrical counterweight 22 sealingly fits within hole 12, which is provided with a peripheral seal 24 for this purpose. A recess (shown in FIG. 3) is provided on the front of counterweight 22 for receiving the earth connection when the flap is in the closed position. The dimensions of housing 11 and of hole 12 are such that the handle, the flap and the counterweight fit in them when the flap device is in the closed position.

According to another embodiment of the invention, counterweight 22 can be arranged on the entire internal surface of flap 4, as shown in FIG. 6. When the flap is closed, the cylindrical counterweight 22 sealingly fits within housing 11 that is provided with a peripheral seal 24 for this purpose. In this embodiment, also shown in FIG. 7 without the flap 4, hole 12—viewed from above—can have a shape that is approximately square, able to receive a correspondingly shaped plug 37, especially of the type that is commonly used in Germany with two lateral earth connections 38 and 39.

Various forms of the essential elements of the device are clearly shown in FIG. 7. This shows the housing 11, of circular shape, provided with the recess 9 and the indentation 8 diametrically opposite, made in plate 3. Plug 37 is positioned so that its top is flush with the base of housing 11. The bottom 41 of plug 37 has two holes 42 and 43 for receiving connectors.

To make it easier for counterweight 22 to be inserted in housing 11 and for the said counterweight to come in contact with seal 24, a chamfer 40 is made on the lower periphery of the counterweight.

Plate 3 is fixed to the floor 2 by means of screws 13 and 14 that pass through the bottom of housing 11, as can be seen in FIGS. 2 and 7.

FIG. 5 shows a covering system comprising a plate 28 on which several flaps 29, 31, 33 and 35 are arranged, each having its respective handle 30, 32, 34 and 36. The flaps are housed in respective housings containing for example a power socket, a telephone socket and two switches. Plate 28 forms, with each flap and the associated handle, a device identical to that described referring to FIGS. 1 to 4, except for the shape of the external contour of the plate and the fact that the plate also forms part of three other covering devices.

The present invention thus provides a device in which transition from a sealed closed position to an open position is effected simply, by means of a retractable pivoting handle.

Of course, the invention is not limited to the examples that have just been described, and numerous developments can be made to these examples while remaining within the scope of the invention. For example, the connecting plug 18 can be replaced with a switch, a push-button or a telephone socket. Moreover, other means of fixing can of course be used.

What is claimed is:

1. A flush-mounting covering device for concealing an accessory (18) in a surface (2), comprising:
   a plate (3) in which a housing (11) is formed, and
   a flap (4) that closes the housing, wherein,
   the closing flap has an external surface,
   on the external surface of the flap there is a C-shaped handle (6) that is connected to the flap by pivoting means (6c, 6d) and can be retracted in a recess (10) formed along an edge of the flap,
   the handle, in an open position, allows a user's finger to be positioned intermediate an inner edge of the handle and the external surface of the flap.

2. A device according to claim 1, wherein the external surface of the flap is of generally circular shape with a lateral projection (5) formed by a lug by which the flap pivots on plate (3), the lug fitting in an indentation (8) formed in the plate.

3. A device according to claim 1, wherein the pivoting means (6c, 6d) are arranged at the two ends of the C-shaped handle and at two corresponding ends of the recess (10) formed along the edge of the flap, the two axes of the pivoting means being parallel to the pivoting axis (19) of the flap, the pivoting axis of the flap and a line common to the two axes of the pivoting means being arranged on either side of the center of the flap.

4. A device according to claim 1, wherein the pivoting means (6c, 6d) of the C-shaped handle are such that in a position of maximum extension, the C-shaped handle is roughly perpendicular to the flap.

5. A device according to claim 1, wherein the C-shaped handle has a base and a manipulating recess (7) at a junction between the handle base and a radially external periphery of the C-shaped handle.

6. A device according to claim 1, wherein the plate has, in one edge of the housing which surrounds the flap in the closed position, a recess (9) for grasping the C-shaped handle, said recess being located opposite a manipulating recess (7) provided on the C-shaped handle at the junction between the base of the C-shaped handle and the external periphery.

7. A device according to claim 1, wherein, to facilitate closing of the flap, the flap has a counterweight (22) on an inside surface.

8. A device according to claim 7, wherein the counterweight (22) is configured so as to fit snugly (24) in the housing.

9. A device according to claim 7, wherein the counterweight (22) has a hollow (23) for receiving a projecting electrical component (17) when the flap is in the closing position.

10. A flush-mounting covering system for concealing a number of electrical accessories, in a surface (2) of a building, comprising a plate (3) in which several pairs are formed, each pair comprising a housing (11) and a flap (4) for closing the housing, according to claim 1.

11. Flush-mounting electrical equipment comprising an electrical accessory mounted in the housing of a covering device according to claim 1.

12. A flush mounted covering device, comprising:
a plate (3) with front and rear sides and an external surface;
a housing (11) exposed to the external surface of the plate, the housing of a circular general shape;
a flap (4) pivoted to the housing, an external face of the flap having a generally circular contour;
a hinging lug (5) formed at the circular contour and engaging the flap to the housing at a hinging axis (19) parallel to the front and rear sides of the plate;
an indentation (8) in the housing that receives the lug (5) so that the flap is pivotable about the hinging axis (19) between i) a closed position in which the flap fits into housing with the external face of the flap flush with the external surface of the plate, and ii) an open position in which the flap provides access to an interior of the housing;
a contoured recess (10) along an external edge of the flap opposite the lug, the contoured recess having parallel edges;
a circular arc shaped handle (6) having a contour matching the contoured recess of the flap, the handle having paralled longintudinal edges, the handle being pivotedly attached to the flap at ends of the contoured recess;
a manipulating recess (7) straddling a junction edge between a base of handle and a radially external surface of the handle,
the handle movable relative to the flap about a pivoting axis (20) between i) a retracted position where an upper surface of the handle is flush with the external surface of the plate and ii) an extended position for opening the flap to access the housing, the handle in the extended position providing a space intermediate an inner edge of the handle and the external face of the flap suitable for inserting a user's finger.

13. The device of claim 12, further comprising:
a counterweight (22) on an interior side of the flap facing the housing, the counterweight having a hollow (23) for receiving a projecting electrical component (17) from within the housing when the flap is in the closed position.

14. The device of claim 12, wherein the handle is C-shaped.

15. A flush mounted covering device, comprising:
a plate (3) with front and rear sides and an external surface;
a housing (11) exposed to the external surface of the plate;
a flap (4) hindged to the housing so that the flap is movable between i) a closed position in which the flap fits into housing with the external face of the flap flush with the external surface of the plate, and ii) an open position in which the flap provides access to an interior of the housing;
a recess (10) along an external edge of the flap, the recess having parallel arcuate edges;
an arcuate handle (6) having a contour matching a contour of the recess of the flap, the handle having paralled longintudinal edges, the handle being pivotedly attached to the flap,
the handle movable pivotably relative to the flap between i) a retracted position where an upper surface of the handle is flush with the external surfaces of the plate and of the flap, and ii) an extended position for opening the flap to access the housing.

16. The device of claim 15, further comprising:
a counterweight (22) on an interior side of the flap facing the housing, the counterweight having a hollow (23) for receiving a projecting component (17) from within the housing when the flap is in the closed position.

17. The device of claim 15, wherein the handle is C-shaped.

* * * * *